(12) United States Patent
Gao et al.

(10) Patent No.: US 11,320,277 B2
(45) Date of Patent: May 3, 2022

(54) PICK-UP/DROP-OFF ZONE HANDOFF BETWEEN AUTONOMOUS VEHICLES

(71) Applicant: Uber Technologies, Inc., San Francisco, CA (US)

(72) Inventors: Shenglong Gao, San Francisco, CA (US); Brent Goldman, San Francisco, CA (US); Konrad Julian Niemiec, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 379 days.

(21) Appl. No.: 16/514,937

(22) Filed: Jul. 17, 2019

(65) Prior Publication Data

US 2020/0240799 A1 Jul. 30, 2020

Related U.S. Application Data

(60) Provisional application No. 62/829,343, filed on Apr. 4, 2019, provisional application No. 62/796,897, filed on Jan. 25, 2019.

(51) Int. Cl.
*G01C 21/34* (2006.01)
*G05D 1/00* (2006.01)
(Continued)

(52) U.S. Cl.
CPC ....... *G01C 21/3438* (2013.01); *G05D 1/0088* (2013.01); *G05D 1/0221* (2013.01);
(Continued)

(58) Field of Classification Search
CPC ............. G01C 21/3438; G05D 1/0088; G05D 1/0221; G05D 2201/0213; G08G 1/202;
(Continued)

(56) References Cited

U.S. PATENT DOCUMENTS

| 9,613,386 B1* | 4/2017 | Arden | G08G 1/205 |
| 2017/0132934 A1* | 5/2017 | Kentley | G08G 1/202 |

(Continued)

FOREIGN PATENT DOCUMENTS

WO 2020154659 7/2020

OTHER PUBLICATIONS

"International Application Serial No. PCT US2020 015046, International Search Report dated Apr. 14, 2020", 5 pgs.
(Continued)

*Primary Examiner* — Thomas Ingram
(74) *Attorney, Agent, or Firm* — Schwegman Lundberg & Woessner, P.A.

(57) ABSTRACT

Aspects of the present disclosure include systems, methods, and devices to facilitate pick-up/drop-off zone (PDZ) handoffs between autonomous vehicles. Consistent with some embodiments, a pick-up/drop-off zone (PDZ) is located based on detecting a first autonomous vehicle stopped at a stopping location. A system determines, based on one or more criteria, whether to request the first autonomous vehicle to remain stopped at the stopping location to create an opportunity for a second autonomous vehicle to claim the PDZ. An amount of time for the first autonomous vehicle to remain stopped at the stopping location is determined based on the one or more criteria. A request to remain stopped at the stopping location is transmitted to a vehicle autonomy system of the first autonomous vehicle based on satisfaction of the one or more criteria. The request specifies the amount of time for the first autonomous vehicle to remain at the stopping location.

20 Claims, 10 Drawing Sheets

(51) Int. Cl.
*G08G 1/00* (2006.01)
*G06Q 20/10* (2012.01)
*G05D 1/02* (2020.01)

(52) U.S. Cl.
CPC .............. *G06Q 20/10* (2013.01); *G08G 1/202* (2013.01); *G05D 2201/0213* (2013.01)

(58) Field of Classification Search
CPC ........ G08G 1/143; G08G 1/148; G06Q 20/10; G06Q 20/3224; G06Q 20/387; G06Q 50/30; G06Q 10/06311
See application file for complete search history.

(56) References Cited

U.S. PATENT DOCUMENTS

| | | | | |
|---|---|---|---|---|
| 2018/0164814 | A1* | 6/2018 | Poeppel | G06Q 10/20 |
| 2018/0308191 | A1* | 10/2018 | Matthiesen | G01C 21/3438 |
| 2018/0329428 | A1* | 11/2018 | Nagy | G05D 1/0088 |
| 2019/0137290 | A1* | 5/2019 | Levy | G01C 21/3461 |
| 2019/0204992 | A1* | 7/2019 | Bowden | G06F 3/04842 |
| 2021/0097559 | A1* | 4/2021 | Albada | G06Q 50/30 |

OTHER PUBLICATIONS

"International Application Serial No. PCT US2020 015046, Written Opinion dated Apr. 14, 2020", 8 pgs.

Rathod, Sheetal DS, "An Autonomous Driverless Car: An Idea To Overcome The Urban Road Challenges", Journal of Information Engineering and Applications,vol. 3, No. 13, Retrieved from the Internet:URL:http: citeseerx.ist.psu.edu viewdoc download?doi =10.1.1.859.7116andrep=replandtype=pdf[retrieved on Mar. 14, 2019], (Dec. 30, 2013), 34-38.

Seshan, Jayaraman, "Efficient Route Finding and Sensors for Collision Detection in Google's Driverless Car", International Journal of Computer Science and Mobile Computing International Journal of Computer Science and Mobile Computing a Monthly Journal of Computer Science, vol. 312, No. 12, (Dec. 1, 2014), 70-78.

"International Application Serial No. PCT US2020 015046, International Preliminary Report on Patentability dated Aug. 5, 2021", 10 pgs.

* cited by examiner

PICK-UP/DROP-OFF ZONE HANDOFF BETWEEN AUTONOMOUS VEHICLES

CLAIM FOR PRIORITY

This application claims the benefit of priority of U.S. Provisional Application No. 62/829,343, filed Apr. 4, 2019 and U.S. Provisional Application No. 62/796,897, filed Jan. 25, 2019, the benefit of priority of each of which is hereby claimed herein, and which applications are hereby incorporated herein by reference in their entireties.

TECHNICAL FIELD

The subject matter disclosed herein relates to autonomous vehicles (AVs). In particular, example embodiments may relate to devices, systems, and methods for operating an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
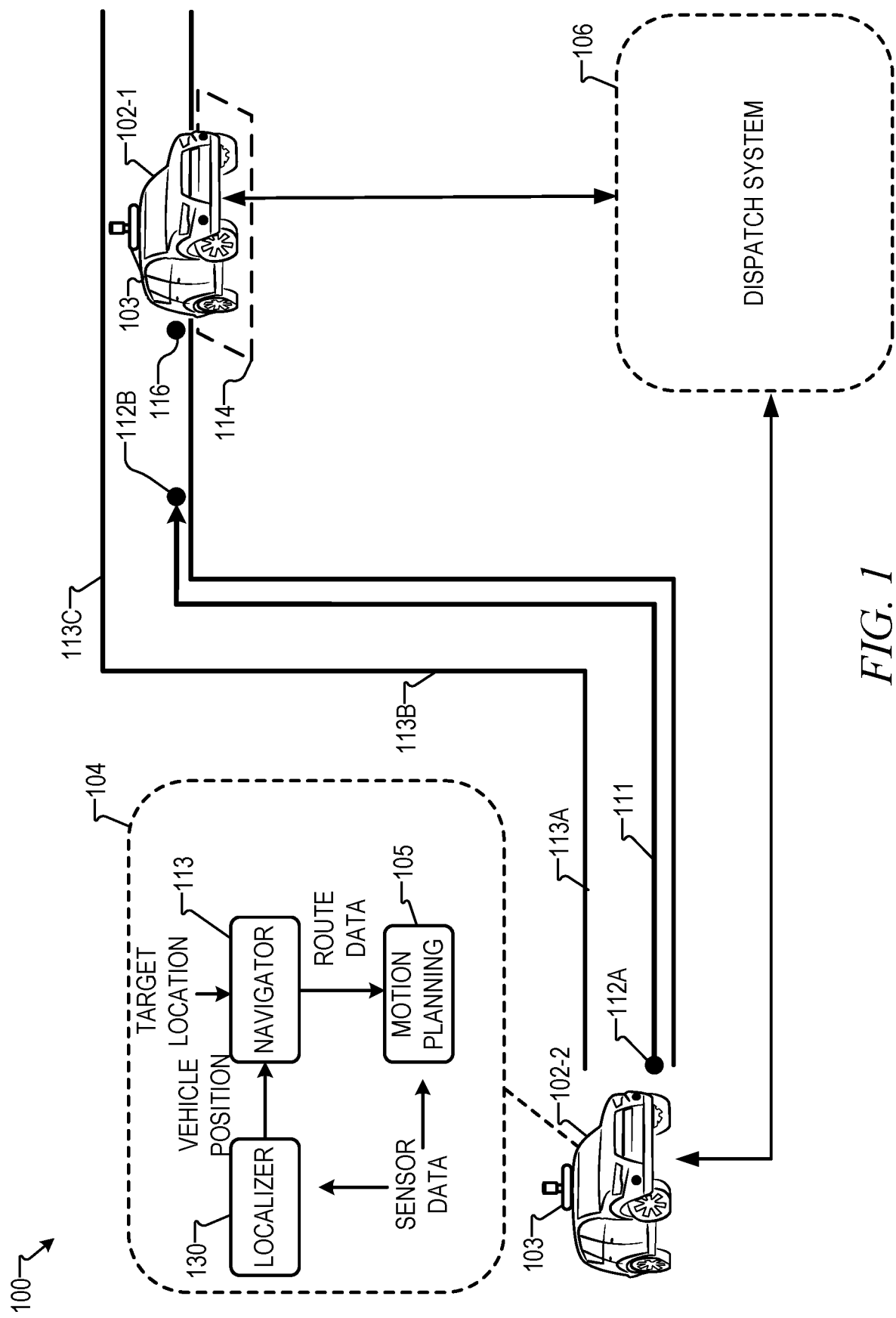
FIG. 1 is a block diagram illustrating an example environment for pick-up/drop off zone (PDZ) handoff between autonomous vehicles (AVs), according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In an autonomous or semi-autonomous vehicle (collectively referred to as an autonomous vehicle (AV) or a self-driving vehicle (SDV)), a vehicle autonomy system controls one or more of braking, steering, or throttle of the vehicle. A vehicle autonomy system can control an autonomous vehicle along a route to a target location. A route is a path that the autonomous vehicle takes, or plans to take, over one or more roadways. In some examples, the target location of a route is associated with one or more pick-up/drop-off zones (PDZs). A PDZ is a location where the autonomous vehicle can legally stop, for example, to pick-up or drop-off one or more passengers, pick-up or drop-off one or more pieces of cargo, recharge, download new data, wait for further service request, wait for other autonomous vehicles or otherwise pull over safely. In some examples, the autonomous vehicle can be used to provide a ride service for passengers. A PDZ can be a place where the autonomous vehicle can pick-up or drop-off a passenger. In other examples, the autonomous vehicle can be used to provide a delivery service of food or other purchased items. A PDZ can be a place where the autonomous vehicle parks to pick up an item or items for delivery or a place where the autonomous vehicle can make a delivery of an item or items to a customer. Non-limiting examples of PDZs include parking spots, driveways, roadway shoulders, and loading docks.

A PDZ can be available for stopping or unavailable for stopping. A PDZ is available for stopping if there is space at the PDZ for the vehicle to stop and pick-up or drop-off a passenger, cargo, or an item. For example, a single-vehicle parking spot is available for stopping if no other vehicle is present. A roadway shoulder location is available for stopping if there is an unoccupied portion of the roadway shoulder that is large enough to accommodate the AV. In many applications, the vehicle autonomy system does not know if a particular PDZ is available until the PDZ is within the range of the AV's sensors. If a first PDZ is unavailable, the AV can wait until the first PDZ is available or, for example, move on to a next PDZ associated with the route target location. If all PDZs associated with a target location are unavailable, the vehicle autonomy system may generate a new route that passes one or more additional PDZs. In any event, locating an available PDZ is a complex and challenging problem for AVs that can needlessly consume time that could otherwise be spent providing additional ride or delivery services.

Aspects of the present disclosure address the forgoing issues with finding available PDZs, among others, with systems, methods, and devices to handle PDZ handoffs between AVs by strategically moving AVs into and out of PDZs to reduce the amount of time that an AV spends in search of a PDZ. The strategic movement of the AVs may include instructing an AV to wait at a PDZ so that another AV is able to claim the PDZ.

Consistent with some embodiments, a method includes identifying a PDZ based on detecting a first AV stopped at a stopping location (e.g., a passenger drop-off location). The method further includes determining whether to request the first AV to remain at the PDZ to create an opportunity for a second AV to claim the PDZ. The determination of whether to request the first AV to remain at the PDZ may be based any one or more of: a target location of a second AV; an estimated arrival time of a second AV at a target location associated with the PDZ; historical availability of PDZs in an area around the PDZ; historical demand for ride or delivery services in the area around the PDZ; costs associated with remaining at the PDZ; a probabilistic model that estimates availability of PDZs in the area; traffic information; and legal restrictions such as time limits or other restrictions imposed on remaining at the PDZ. The method may further include determining an amount of time the first AV is to remain at the PDZ based on or more of the factors referenced above. Based on an affirmative determination, the method includes transmitting a request to the first AV to remain at the PDZ. The request may further specify the determined amount of time that the first AV should remain at the PDZ.

In some embodiments, the request may include a command that instructs the vehicle computing system of the first AV to remain at the PDZ. In some embodiments, the first AV or a human passenger thereof may be provided with an option to either accept or reject the request. Assuming an AV is instructed or opts to remain at the PDZ based on the request, the first AV may vacate the PDZ in response to receiving an indication that an approaching, second AV is claiming the PDZ or based on the first AV remaining at the PDZ for the determined amount of time without another AV claiming the PDZ The method may further include identifying a second AV to claim the PDZ. The identifying of the second AV may be based on the second AV having a target location that is within a threshold distance of the PDZ or having an estimated time of arrival at the target location or the PDZ that satisfies a timing constraint. The identifying of the second AV may further include determining operational capabilities of the second AV and determining whether the second AV is capable of utilizing the PDZ based on the operational capabilities of the second AV (e.g., whether the second AV is capable of navigating to the PDZ or positioning itself within the PDZ).

The method may further include generating and transmitting a notification to the second AV that identifies the PDZ as being available for stopping. The generating of the notification may further include generating a route to the PDZ based on a current location of the second AV, a target location of the second AV, and operational capabilities of the second AV. In some embodiments, the notification may include a command to instruct the second AV to travel to the PDZ along the route. In other embodiments, the second AV may be provided the option to utilize the PDZ and/or the navigation route to the PDZ.

Upon arriving at the PDZ, the second AV may provide an indication of its arrival at the PDZ. Depending on the embodiment, the indication may be provided directly to the first AV or may be transmitted to a server computer system that facilitates the PDZ handoff between the first and second AVs. In embodiments in which the server computer system receives the indication from the second AV, the server computer system transmits a request to the first AV to vacate the PDZ. Upon the first AV vacating the PDZ based on either the indication from the second AV or the request from the server, the second AV may claim the PDZ and utilize the PDZ for stopping.

With reference to FIG. 1, an example environment 100 for pick-up/drop off zone (PDZ) handoff between AVs is illustrated, according to some embodiments. The environment 100 includes vehicles 102-1 and 102-2. Each of the vehicles 102-1 and 102-2 can be a passenger vehicle such as a car, a truck, a bus, or other similar vehicle. Each of the vehicles 102-1 and 102-2 can also be a delivery vehicle, such as a van, a truck, a tractor trailer, etc. The vehicles 102-1 and 102-2 are self-driving vehicles (SDV) or autonomous vehicles (AV) that include a vehicle autonomy system that is configured to operate some or all of the controls of the vehicle (e.g., acceleration, braking, steering). As an example, as shown, the vehicle 102-2 includes a vehicle autonomy system 104.

In some examples, the vehicle autonomy system 104 is operable in different modes, where the vehicle autonomy system 104 has differing levels of control over the vehicle 102-2 in different modes. In some examples, the vehicle autonomy system 104 is operable in a full autonomous mode in which the vehicle autonomy system 104 has responsibility for all or most of the controls of the vehicle 102-2. In addition to or instead of the full autonomous mode, the vehicle autonomy system 104, in some examples, is operable in a semi-autonomous mode in which a human user or driver is responsible for some or all of the control of the vehicle 102-2. Additional details of an example vehicle autonomy system are provided in FIG. 2.

Each of the vehicles 102-1 and 102-2 has one or more remote-detection sensors 103 that receive return signals from the environment 100. Return signals may be reflected from objects in the environment 100, such as the ground, buildings, trees, etc. The remote-detection sensors 103 may include one or more active sensors, such as LIDAR, RADAR, and/or SONAR that emit sound or electromagnetic radiation in the form of light or radio waves to generate return signals. The remote-detection sensors 103 can also include one or more passive sensors, such as cameras or other imaging sensors, proximity sensors, etc., that receive return signals that originated from other sources of sound or electromagnetic radiation. Information about the environment 100 is extracted from the return signals. In some examples, the remote-detection sensors 103 include one or more passive sensors that receive reflected ambient light or other radiation, such as a set of monoscopic or stereoscopic cameras. Remote-detection sensors 103 provide remote sensor data that describes the environment 100. Each of the vehicles 102-1 and 102-2 can also include other types of sensors, for example, as described in more detail with respect to FIG. 2.

As an example of the operation of the vehicle autonomy system 104, the system 104 generates a route 111 for the vehicle 102-2 extending from a starting location 112A to a target location 112B. The starting location 112A can be a current vehicle position and/or a position to which the vehicle 102-2 will travel to begin the route 111. The route 111 describes a path of travel over one or more roadways including, for example, turns from one roadway to another, exits on or off a roadway, etc. In some examples, the route 111 also specifies lanes of travel, for example, on roadways having more than one lane of travel. In this example, the initial route 111 extends along three roadways 113A, 113B, and 113C, although, in various examples, routes extend over more or fewer than three roadways.

The environment 100 also includes a dispatch system 106. The dispatch system 106 comprises one or more computer server systems configured to exchange data with the vehicle autonomy systems of the vehicles 102-1 and 102-2. The data may include command or instructions for the vehicles 102-1 and 102-2. Data from the dispatch system 106 can be provided to each vehicle 102-1, 102-2 via a wireless network, for example. The dispatch system 106 is responsible for facilitating PDZ handoffs between the vehicles 102-1 and 102-2.

As shown, the vehicle 102-1 is stopped at a stopping location 114. The stopping location 114 is associated with a target location 116 of the vehicle 102-1. As an example, where there target location 116 of the vehicle 102-1 is at or near a city block, the stopping location 114 can be a shoulder or curb-side area on the city block where the vehicle 102-1 can pull-over. The stopping location 114 may be associated with the target location 116 of the vehicle 102-1 based on being within a threshold distance of the target location 116. In some examples, the stopping location 114 is associated with the target location 116 based on the direction of travel of the vehicle 102-1. For example, in the United States, where traffic travels on the right-hand side of the roadway, stopping locations on the right-hand shoulder of the roadway relative to the vehicle 102-1 are associated with a target location, such as 116, while stopping locations on the left-hand shoulder of the roadway may not be, as it may not be desirable for the vehicle 102-1 to cross traffic to reach the left-hand shoulder of the roadway.

Based on the vehicle 102-2 being stopped at the stopping location 114, the dispatch system 106 identifies the stopping location 114 as a PDZ. The dispatch system 106 may request that the vehicle 102-1 remain at the stopping location 114 for a specified period of time to provide an opportunity for the vehicle 102-2 to claim the PDZ. For example, the dispatch system 106 may request the vehicle 102-1 to remain at the stopping location 114 based on determining that the stopping location 114 is also associated with the target location 112B of the vehicle 102-2, for example, based on the stopping location 114 of the vehicle 102-1 being within a threshold distance of the target location 112B of the vehicle 102-2. The request may be further or alternatively based on any one or more of: an estimated arrival time of the vehicle 102-2 at the target location 112B; historical availability of PDZs associated with the target location 112B; historical demand for ride or delivery services in the area around the PDZ; costs associated with the vehicle 102-1 remaining at the stopping location 114; a probabilistic model that estimates availability of PDZs in the area; traffic information; and legal restrictions such as time limits or other restrictions imposed on remaining at the stopping location 114. The vehicle 102-1 or a passenger thereof may be provided the opportunity to accept or reject the request.

Upon receiving confirmation that the vehicle 102-1 will remain stopped at the stopping location 114, the dispatch system 106 may transmit a notification to the vehicle autonomy system 104 of the vehicle 102-2 to notify the vehicle 102-2 about anticipated availability of the PDZ at the stopping location 114. The dispatch system 106 may transmit the notification to the vehicle 102-2 based on, for example, the stopping location 114 also being associated with the target location 112B of the vehicle 102-2.

The vehicle autonomy system 104 controls the vehicle 102-2 along the route 111 towards the target location 112B. For example, the vehicle autonomy system 104 controls one or more of the steering, braking, and acceleration of the vehicle 102-2 to direct the vehicle 102-2 along the roadway according to the route 111. Based on receiving the notification from the dispatch system 106, the vehicle autonomy system 104 may cause the vehicle 102-2 to travel directly to the PDZ (i.e., the stopping location 114). To be able to stop at the PDZ, the vehicle autonomy system 104 may provide an indication of its arrival to either the dispatch system 106 or directly to the vehicle 102-1. In embodiments in which the vehicle autonomy system 104 provides the indication to the dispatch system 106, the dispatch system 106 may, in turn, provide the indication to the vehicle 102-1. The vehicle 102-1 vacates the PDZ (e.g., leaves the stopping location 114) based on the indication, thereby creating an available PDZ for the vehicle 102-2 to claim (e.g., to stop at).

In some examples, the vehicle autonomy system 104 separates the process of stopping the vehicle 102-2 at a stopping location from generating routes and/or route extensions. For example, the vehicle autonomy system 104 of FIG. 1 includes a localizer system 130, a navigator system 113, and the motion planning system 105. The navigator system 113 is configured to generate routes, including route extensions. The motion planning system 105 is configured to determine whether stopping locations associated with a target location are available and cause the vehicle to stop at a stopping location that is available. The navigator system 113 continues to generate route extensions, as described herein, until the motion planning system 105 causes the vehicle 102-2 to stop at a stopping location.

The localizer system 130 can receive sensor data from remote detection sensors 103 (and/or other sensors) to generate a vehicle position. In some examples, the localizer system 130 generates a vehicle pose including the vehicle position and vehicle attitude, described in more detail herein. The vehicle position generated by the localizer system 130 is provided to the navigator system 113. The navigator system 113 also receives and/or accesses target location data describing the vehicle's target location. The target location data can be received from a user, from the dispatch system 106, from another component of the vehicle autonomy system 104 and/or from another suitable source. Using the target location data and the vehicle position, the navigator system 113 generates route data describing the route 111. The route data can include an indication of the route 111 and of stopping location 114. The route data is provided to the motion planning system 105.

The motion planning system 105 uses the route data to control the vehicle 102-1 along the route 111. For example, the motion planning system 105 sends control commands to the throttle, steering, brakes, and/or other controls of the vehicle 102 to cause the vehicle 102-1 to traverse the route 111. The motion planning system 105 is programmed to stop the vehicle 102-1 if the vehicle 102-1 approaches stopping location 114. The navigator system 113 continues to generate route data describing routes, for example, until the motion planning system 105 successfully stops the vehicle 102-1 at the stopping location 114.

Figure 2:
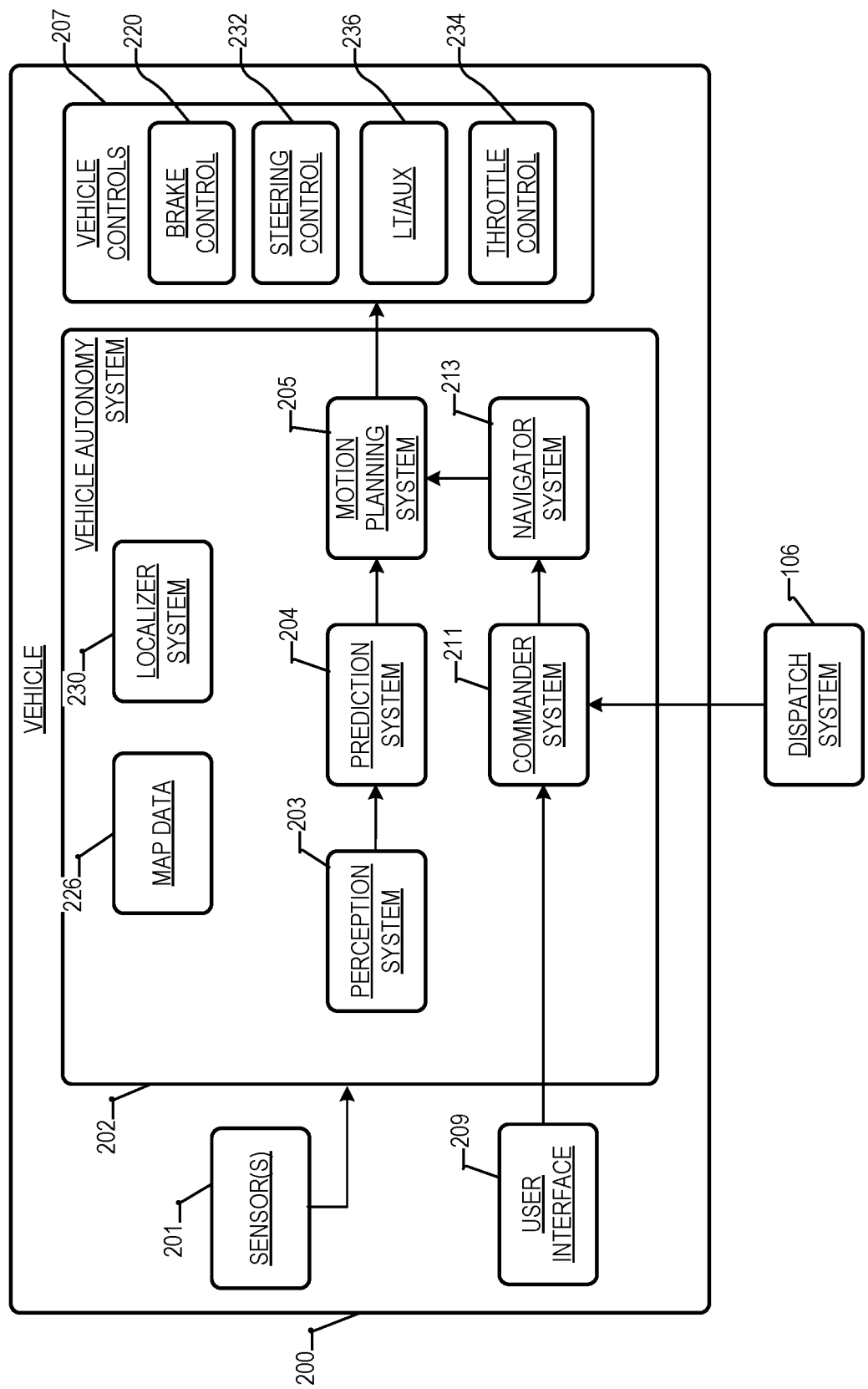
FIG. 2 is a block diagram depicting an example vehicle, according to some embodiments.

FIG. 2 is a block diagram depicting an example vehicle 200, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the vehicle 200 to facilitate additional functionality that is not specifically described herein.

The vehicle 200 includes one or more sensors 201, a vehicle autonomy system 202, and one or more vehicle controls 207. The vehicle 200 can be an autonomous vehicle, as described herein.

The vehicle autonomy system 202 includes a commander system 211, a navigator system 213, a perception system 203, a prediction system 204, a motion planning system 205, and a localizer system 230 that cooperate to perceive the surrounding environment of the vehicle 200 and determine a motion plan for controlling the motion of the vehicle 200 accordingly.

The vehicle autonomy system 202 is engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate route through the environment. The vehicle autonomy system 202 sends commands to control the one or more vehicle controls 207 to operate the vehicle 200 according to the route.

Various portions of the vehicle autonomy system 202 receive sensor data from the one or more sensors 201. For example, the sensors 201 may include remote-detection sensors as well as motion sensors such as an inertial measurement unit (IMU), one or more encoders, or one or more odometers. The sensor data can include information that describes the location of objects within the surrounding environment of the vehicle 200, information that describes the motion of the vehicle 200, etc.

The sensors 201 may also include one or more remote-detection sensors or sensor systems, such as a LIDAR, a RADAR, one or more cameras, etc. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 201 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 201 can include a positioning system. The positioning system determines a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, Wi-Fi access points) and/or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 200) of points that correspond to objects within the surrounding environment of the vehicle 200. In some implementations, the sensors 201 can be positioned at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200. Other locations can be used as well.

The localizer system 230 receives some or all of the sensor data from sensors 201 and generates vehicle poses for the vehicle 200. A vehicle pose describes the position and attitude of the vehicle 200. The vehicle pose (or portions thereof) can be used by various other components of the vehicle autonomy system 202 including, for example, the perception system 203, the prediction system 204, the motion planning system 205, and the navigator system 213.

The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the localizer system 230 generates vehicle poses periodically (e.g., every second, every half second). The localizer system 230 appends time stamps to vehicle poses, where the time stamp for a pose indicates the point in time that is described by the pose. The localizer system 230 generates vehicle poses by comparing sensor data (e.g., remote sensor data) to map data 226 describing the surrounding environment of the vehicle 200.

In some examples, the localizer system 230 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 230 generates vehicle poses. Accordingly, the pose filter generates some vehicle poses by extrapolating from a previous pose estimate utilizing motion sensor data.

Vehicle poses and/or vehicle positions generated by the localizer system 230 can be provided to various other components of the vehicle autonomy system 202. For example, the commander system 211 may utilize a vehicle position to determine whether to respond to a call from a dispatch system 240.

The commander system 211 determines a set of one or more target locations that are used for routing the vehicle 200. The target locations can be determined based on user input received via a user interface 209 of the vehicle 200. The user interface 209 may include and/or use any suitable input/output device or devices. In some examples, the commander system 211 determines the one or more target locations considering data received from the dispatch system 106.

The dispatch system 106 can be programmed to provide instructions to multiple vehicles, for example, as part of a fleet of vehicles for moving passengers and/or cargo. Data from the dispatch system 106 can be provided to each vehicle via a wireless network, for example. As will be discussed in further detail below, the dispatch system 106 is responsible for facilitating PDZ handoffs between vehicles.

The navigator system 213 receives one or more target locations from the commander system 211 or user interface 209 along with map data 226. Map data 226, for example, may provide detailed information about the surrounding environment of the vehicle 200. Map data 226 can provide information regarding identity and location of different roadways and segments of roadways (e.g., lane segments). A roadway is a place where the vehicle 200 can drive and may include, for example, a road, a street, a highway, a lane, a parking lot, or a driveway.

From the one or more target locations and the map data 226, the navigator system 213 generates route data describing a route for the vehicle to take to arrive at the one or more target locations.

In some implementations, the navigator system 213 determines route data based on applying one or more cost functions and/or reward functions for each of one or more candidate routes for the vehicle 200. For example, a cost function can describe a cost (e.g., a time of travel) of adhering to a particular candidate route while a reward function can describe a reward for adhering to a particular candidate route. For example, the reward can be of a sign opposite to that of cost. Route data is provided to the motion planning system 205, which commands the vehicle controls 207 to implement the route or route extension, as described herein.

The perception system 203 detects objects in the surrounding environment of the vehicle 200 based on sensor data, map data 226, and/or vehicle poses provided by the localizer system 230. For example, map data 226 used by the perception system 203 may describe roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto.

In some examples, the perception system 203 determines state data for one or more of the objects in the surrounding environment of the vehicle 200. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 can determine state data for each object over a number of iterations. In particular, the perception system 203 updates the state data for each object at each iteration. Thus, the perception system 203 detects and tracks objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 generates prediction data associated with one or more of the objects detected by the perception system 203. In some examples, the prediction system 204 generates prediction data describing each of the respective objects detected by the prediction system 204.

Prediction data for an object can be indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 predicts a trajectory (e.g., path) corresponding to a left turn for the vehicle 200 such that the vehicle 200 turns left at the intersection. Similarly, the prediction system 204 determines predicted trajectories for other objects, such as bicycles, pedestrians, parked vehicles, etc. The prediction system 204 provides the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object, and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 commands the vehicle controls based at least in part on the predicted trajectories associated with the objects within the surrounding environment of the vehicle 200, the state data for the objects provided by the perception system 203, vehicle poses provided by the localizer system 230, map data 226, and route data provided by the navigator system 213. Stated differently, given information about the current locations of objects and/or predicted trajectories of objects within the surrounding environment of the vehicle 200, the motion planning system 205 determines control commands for the vehicle 200 that best navigate the vehicle 200 along the route or route extension relative to the objects at such locations and their predicted trajectories on acceptable roadways.

In some implementations, the motion planning system 205 can also evaluate one or more cost functions and/or one or more reward functions for each of one or more candidate control commands or sets of control commands for the vehicle 200. Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate control command or set of control commands. The motion planning system 205 can select or determine a control command or set of control commands for the vehicle 200 based at least in part on the cost function(s) and the reward function(s). For example, the motion plan that minimizes the total cost can be selected or otherwise determined.

In some implementations, the motion planning system 205 can be configured to iteratively update the route for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

The motion planning system 205 can provide control commands to one or more vehicle controls 207. For example, the one or more vehicle controls 207 can include throttle systems, brake systems, steering systems, and other control systems, each of which can include various vehicle controls (e.g., actuators or other devices that control gas flow, steering, braking) to control the motion of the vehicle 200. The various vehicle controls 207 can include one or more controllers, control devices, motors, and/or processors.

The vehicle controls 207 can include a brake control module 220. The brake control module 220 is configured to receive a braking command and bring about a response by applying (or not applying) the vehicle brakes. In some examples, the brake control module 220 includes a primary system and a secondary system. The primary system receives braking commands and, in response, brakes the vehicle 200. The secondary system may be configured to determine a failure of the primary system to brake the vehicle 200 in response to receiving the braking command.

A steering control system 232 is configured to receive a steering command and bring about a response in the steering mechanism of the vehicle 200. The steering command is provided to a steering system to provide a steering input to steer the vehicle 200.

A lighting/auxiliary control module 236 receives a lighting or auxiliary command. In response, the lighting/auxiliary control module 236 controls a lighting and/or auxiliary system of the vehicle 200. Controlling a lighting system may include, for example, turning on, turning off, or otherwise modulating headlines, parking lights, running lights, etc. Controlling an auxiliary system may include, for example, modulating windshield wipers, a defroster, etc.

A throttle control system 234 is configured to receive a throttle command and bring about a response in the engine speed or other throttle mechanism of the vehicle. For example, the throttle control system 234 can instruct an engine and/or engine controller, or other propulsion system component to control the engine or other propulsion system of the vehicle 200 to accelerate, decelerate, or remain at its current speed.

Each of the perception system 203, the prediction system 204, the motion planning system 205, the commander system 211, the navigator system 213, and the localizer system 230 can be included in or otherwise a part of a vehicle autonomy system 202 configured to control the vehicle 200 based at least in part on data obtained from one or more sensors 201. For example, data obtained by one or more sensors 201 can be analyzed by each of the perception system 203, the prediction system 204, and the motion planning system 205 in a consecutive fashion in order to control the vehicle 200. While FIG. 2 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 202 includes one or more computing devices, which may implement all or parts of the perception system 203, the prediction system 204, the motion planning system 205, and/or the localizer system 230.

Figure 3A:
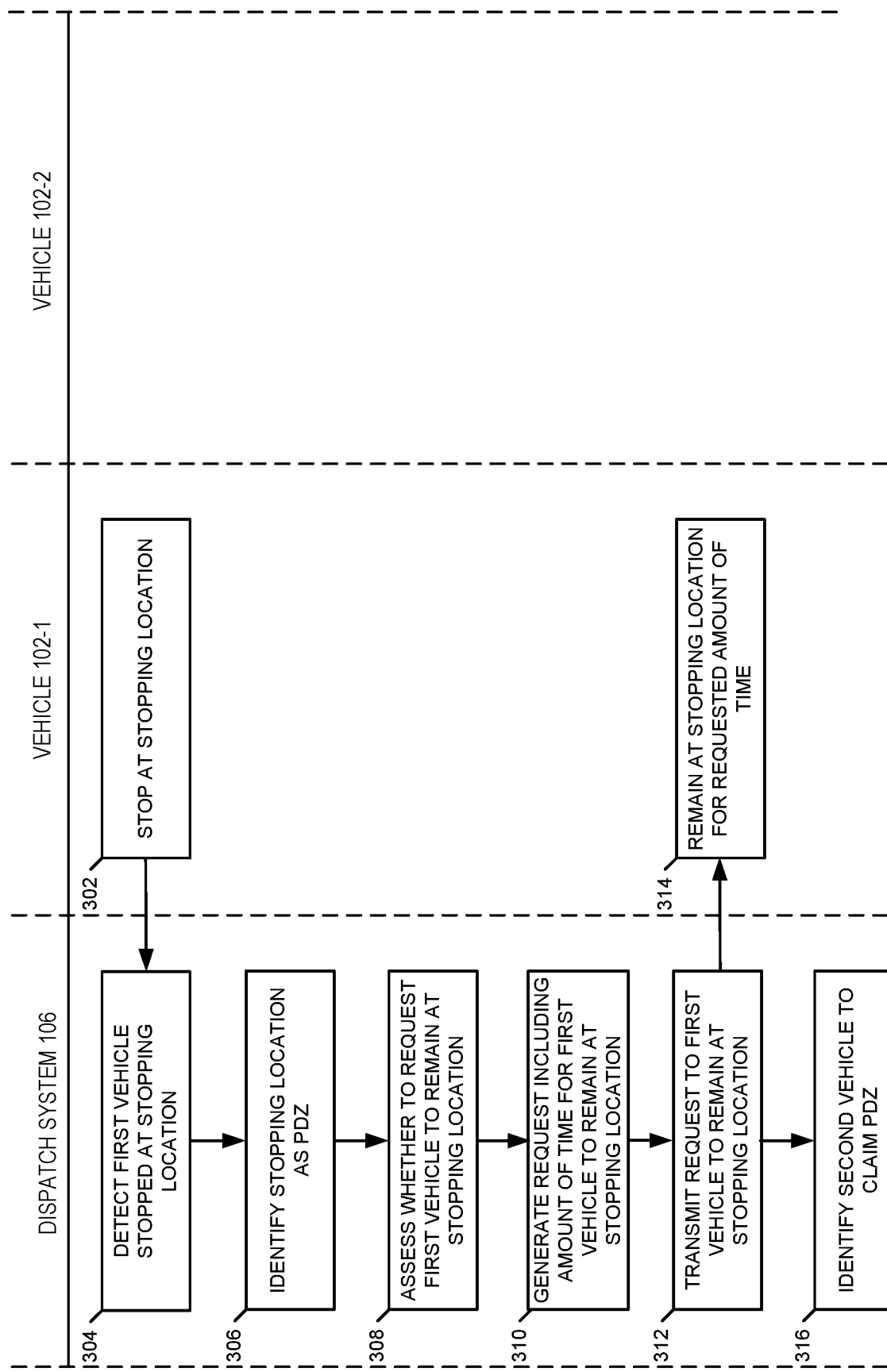
FIGS. 3A and 3B are an interaction diagram depicting exchanges between a dispatch system and two AVs in performing a method of PDZ handoff, according to some embodiments.
Figure 3B:
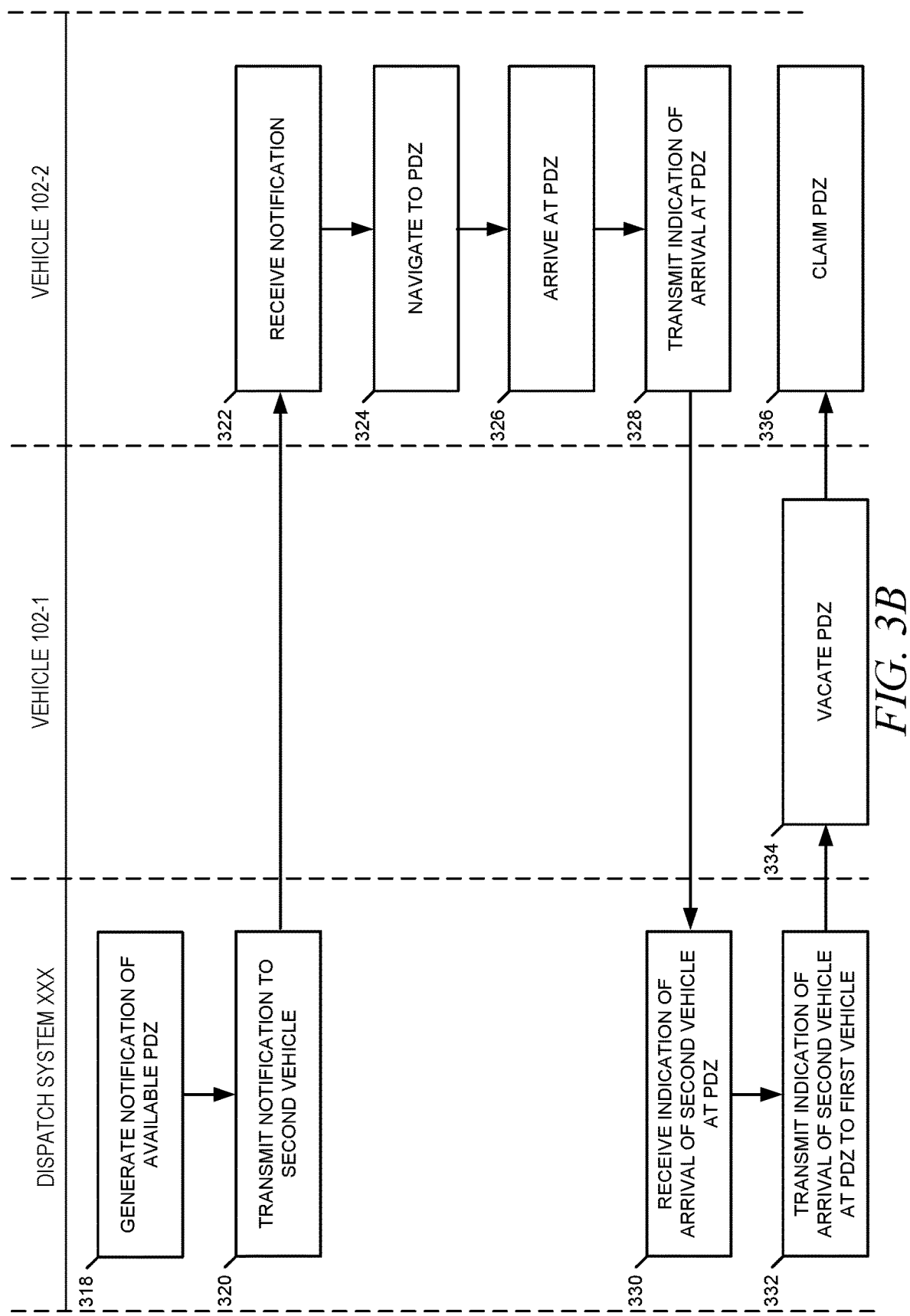
Figure 4:
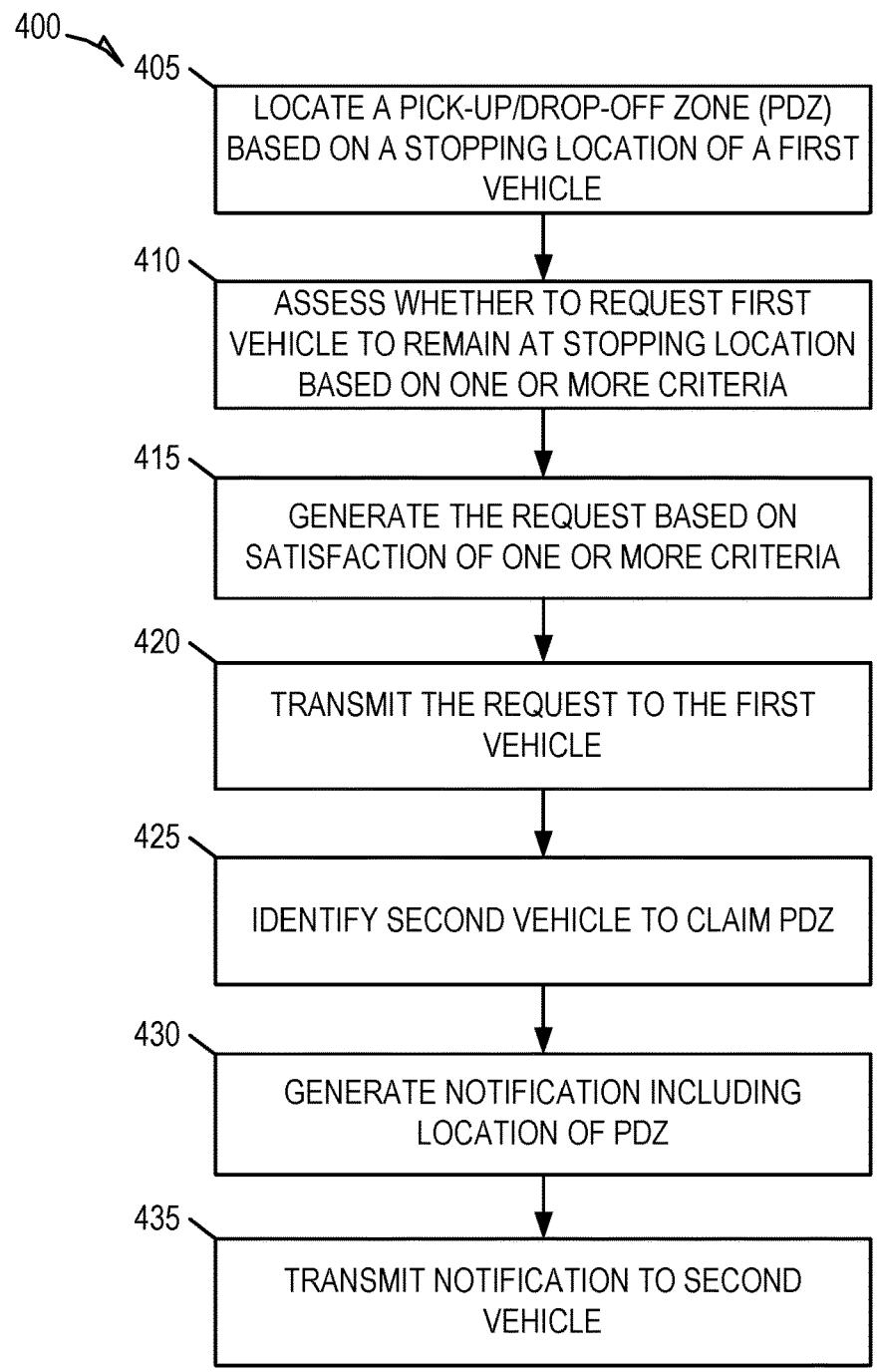
FIGS. 4-8 are flowcharts illustrating example operations of the dispatch system in performing a method for PDZ handoff between two autonomous vehicles, according to some embodiments.

FIGS. 3A and 3B show an interaction diagram depicting exchanges between a dispatch system and two AVs in performing a method 300 of PDZ handoff, according to some embodiments. As shown in FIG. 3A, the method 300 begins at operation 302, where a first vehicle (vehicle 102-1) stops at a stopping location. At operation 304, the dispatch system 106 detects the first vehicle stopped at the stopping location, and at operation 306, the dispatch system 106 identifies the stopping location of the first vehicle as a PDZ. At operation 308, the dispatch system 106 assesses whether to request the first vehicle to remain at the stopping location to create an opportunity for a second vehicle to claim the PDZ. The assessment by the dispatch system 106 may be based on one or more criteria such as a target location of a second vehicle; an estimated arrival time of a second vehicle at a target location associated with the PDZ; historical availability of PDZs associated with a target location of a second vehicle; historical demand for ride or delivery services in the area around the stopping location; costs associated with remaining at the stopping location; a probabilistic model that estimates availability of PDZs in the area of the stopping location; traffic information; and legal restrictions such as time limits or other restrictions imposed on remaining at the stopping location.

At operation 310, the dispatch system 106 generates a request for the first vehicle to remain at the stopping location. The generating of the request includes determining an amount of time for the first vehicle to remain at the stopping location based on one or more criteria referenced above. The request specifies the amount of time. At operation 312, the dispatch system 106 transmits the request to a vehicle autonomy system of the first vehicle (e.g., vehicle autonomy system 104). The first vehicle or a passenger thereof may be provided an option to accept or reject the request. For example, a graphical user interface (GUI) may be provided to a display within the first vehicle (e.g., an embedded display or a display of a mobile device of the user) and the GUI may present the option to accept or reject the request to a human passenger in the first vehicle. If the request is denied, the dispatch system 106 may identify another PDZ.

If the request is accepted, the first vehicle remains at the stopping location for the requested amount of time based on the request (operation 314). In some embodiments, a GUI provided to a display with the first vehicle may display a countdown timer to inform a human passenger of the time remaining for the first vehicle to remain stopped at the stopping location.

At operation 316, the dispatch system 106 identifies a second vehicle (vehicle 102-2) to claim the PDZ. The dispatch system 106 may identify the second vehicle based on any one or more of: a target location of the second vehicle; a distance between the target location of the second vehicle and the PDZ; an estimated time of arrival of the second vehicle at the stopping location or the PDZ; and operational capabilities of the second vehicle.

As shown in FIG. 3B, at operation 318, the dispatch system 106 generates a notification of anticipated availability of the PDZ based on anticipation of the first vehicle at least after the amount of time in the request expires. The notification includes the location of the PDZ along with an indication of the anticipated availability. At operation 320, the dispatch system 106 transmits the notification to a vehicle autonomy system (e.g., vehicle autonomy system 202) of the second vehicle.

At operation 322, the second vehicle receives the notification and travels to the PDZ, at operation 324. The second vehicle may travel to the PDZ along a route included in the notification, along an original route determined by the vehicle autonomy system of the second vehicle based on the target location of the second vehicle, or along an updated route determined by the vehicle autonomy system of the second vehicle based on the original route in light of the PDZ. At operation 326, the second vehicle arrives at the PDZ, and at operation 328, the second vehicle transmits an indication of arrival at the PDZ to the dispatch system 106.

At operation 330, the dispatch system 106 receives the indication of the arrival of the second vehicle at the PDZ, and at operation 332, the dispatch system 106 transmits the indication to the vehicle autonomy system of the first vehicle. In some other embodiments, the second vehicle may provide the indication of arrival at the PDZ directly to the vehicle autonomy system of the first vehicle without using the dispatch system 106 as an intermediary for providing the indication to the first vehicle.

At operation 334, the first vehicle vacates the PDZ based on the indication. At operation 336, the second vehicle claims the PDZ based on the first vehicle vacating the PDZ. The second vehicle claims the PDZ by stopping at the location of the PDZ.

FIGS. 4-7 are flowcharts illustrating example operations of the dispatch system 106 in performing a method 400 for PDZ handoff between two autonomous vehicles, according to some embodiments. The method 400 may be embodied in computer-readable instructions for execution by a hardware component (e.g., a processor) such that the operations of the method 400 may be performed by one or more components of the dispatch system 106. Accordingly, the method 400 is described below, by way of example with reference thereto. However, it shall be appreciated that the method 400 may be deployed on various other hardware configurations and is not intended to be limited to deployment on the dispatch system 106.

At operation 405, the dispatch system 106 locates a PDZ based on a stopping location of a first AV (e.g., vehicle 102-1). As noted above, the stopping location is a location where the first AV stops to pick up or drop off one or more passengers, one or more pieces of cargo, or an item. A non-exhaustive list of example stopping locations includes a parking spot, a driveway, a roadway shoulder, or a loading dock.

At operation 410, the dispatch system 106 assesses whether to request the first vehicle to remain at the stopping location based on one or more criteria. The one or more criteria may, for example, include a target location of a second vehicle; an estimated arrival time of a second vehicle at a target location associated with the PDZ; historical availability of PDZs associated with a target location of a second vehicle; historical demand for ride or delivery services in the area around the PDZ; costs associated with remaining at the stopping location; a probabilistic model that estimates availability of PDZs in the area; traffic information; and legal restrictions such as time limits or other restrictions imposed on remaining at the stopping location. Accordingly, in assessing whether to request the first vehicle to remain at the stopping location, the dispatch system 106 may perform any one or more of: determining whether a second vehicle has been assigned a target location associated with the PDZ; determining whether a target location of a second vehicle is within a threshold distance of the PDZ; determining whether an estimate arrival time of a second vehicle at a target location or at the PDZ is within a threshold time; determining a historical demand for ride or delivery services around the stopping location and determining whether the historical demand exceeds a demand threshold; determining a costs associated with the first vehicle remaining at the stopping location rather than performing a ride or delivery service and determining whether the costs exceeds a threshold cost; estimating availability of PDZs in the area of the stopping location using a probabilistic model and determining whether the estimated availability exceeds an availability threshold; determining whether traffic flow in the area exceeds a threshold traffic flow; and determining one or more legal restrictions applicable to remaining stopped at the stopping location and determining whether having the first vehicle remain at stopping location would violate the one or more legal restrictions.

At operation 415, the dispatch system 106 generates the request (e.g., an electronic message or data packet) for the first vehicle to remain stopped at the stopping location based on satisfaction of one or more criteria. For example, the dispatch system 106 may generate the request based on any one or more of: determining a second vehicle has been assigned a target location associated with the PDZ; determining a target location of a second vehicle is within the threshold distance of the PDZ; determining an estimated arrival time of a second vehicle at a target location or at the PDZ is within the threshold time; determining the historical demand exceeds the demand threshold; determining the costs associated with remaining at the stopping location do not exceed the threshold cost; determining the estimated availability is below the availability threshold; determining traffic flow in the area exceeds the threshold traffic flow; and determining that having the first vehicle remain at stopping location would not violate the one or more legal restrictions. The request may further specify an amount of time for the first vehicle to remain stopped at the stopping location.

In some embodiments, the request includes a command that, when received by a vehicle autonomy system (e.g., vehicle autonomy system 202) of the first vehicle, causes the vehicle autonomy system to control operation of the first vehicle such that the first vehicle remains stopped at the stopping location (e.g., for a certain amount of time or until a second vehicle arrives to claim the PDZ). Consistent with these embodiments, the generating of the request includes generating the command.

In some embodiments, the request includes an option to accept or reject the request. Consistent with these embodiments, the vehicle autonomy system of the first vehicle decides whether to remain at the stopping location. The vehicle autonomy system of the first vehicle may decide whether to remain at the stopping location based on user input, input from an external system, or based on other criteria.

In some embodiments, the request may further include a monetary reward for the first vehicle to remain at the stopping location. In embodiments in which the request also includes an option to accept or deny the request, the monetary reward may serve as an incentive for the first vehicle to accept the request.

At operation 420, the dispatch system 106 transmits the request to the first vehicle. More specifically, the dispatch system 106 transmits the request to a vehicle autonomy system (e.g., vehicle autonomy system 202) of the first vehicle. In embodiments in which the request includes the command, the vehicle autonomy system of the first vehicle, in response to receiving the request, controls operation of the first vehicle such that the first vehicle remains stopped at the stopping location (e.g., for a certain amount of time or until a second vehicle arrives to claim the PDZ). In embodiments in which the request includes the option to accept or reject, the vehicle autonomy system of the first vehicle responds to the request by providing a response to the dispatch system 106 that indicates whether the vehicle autonomy system accepted or rejected the request. The vehicle autonomy system of the first vehicle may determine whether to accept or reject the request based on user input, input from an external system, or based on other criteria. If the request indicates that the first vehicle has rejected the request, the method 400 ends at operation 420 and may be reinitiated at a later time with respect to another PDZ. Otherwise, the method 400 continues to operation 425.

At operation 425, the dispatch system 106 identifies a second vehicle to claim the PDZ. The dispatch system 106 may identify the second vehicle based on a target location of the second vehicle, a distance between the target location and the PDZ, an estimated time of arrival of the second vehicle at the target location or PDZ; and operational capabilities of the second vehicle. Further details regarding the identifying of the second vehicle to claim the PDZ are discussed below in reference to FIG. 6.

At operation 430, the dispatch system 106 generates a notification of predicted availability of a PDZ based on transmitting the request to the first vehicle. The notification identifies the location of the PDZ and indicates its predicted availability. In some embodiments, the request may include a route to the PDZ. Consistent with these embodiments, the generating of the notification includes generating a route to the PDZ. The generating of the route may include modifying a current route of the second vehicle or generating a new route.

In some embodiments, the request may include an option for the second AV to claim the PDZ. In some embodiments, the request may include a command that, when received by a vehicle autonomy system (e.g., vehicle autonomy system 202) of the second vehicle, causes the vehicle autonomy system to control operation of the second vehicle such that the second vehicle travels to the PDZ. Consistent with these embodiments, the generating of the request includes generating the command.

At operation 435, the dispatch system 106 transmits the notification to the second vehicle. In embodiments in which the request includes the command, the vehicle autonomy system of the second vehicle, in response to receiving the notification, controls operation of the second vehicle such that the second vehicle travels along a route to the PDZ. The route may be a route included in the notification or a route that is generated or modified by the vehicle autonomy system of the second vehicle.

In embodiments in which the request includes the option, the vehicle autonomy system of the second vehicle transmits a response to the dispatch system 106 to confirm that the second vehicle is to claim the PDZ. If the second vehicle does not confirm that it is to claim the PDZ, the dispatch system 106 may return to operation 425 and identify a third AV to claim the PDZ. If the second vehicle confirms that it will claim the PDZ, the vehicle autonomy system of the second vehicle controls operation of the second vehicle such that the second vehicle travels along a route to the PDZ (e.g., a route included in the notification or a route that is generated or modified by the vehicle autonomy system of the second vehicle).

In some embodiments, the dispatch system 106 identifies multiple candidate AVs to claim the PDZ at operation 425 and transmits a notification to each candidate AV. In some embodiments, the dispatch system 106 may award the PDZ to the first vehicle to respond. In some embodiments, the notification may provide each of the candidate AVs to submit a bid amount to claim the PDZ, and the dispatch system 106 may award the PDZ to the vehicle with the highest bid. Consistent with at least some of these embodiments, at least a portion of the winning bid amount may be provided to the first vehicle as a monetary reward for remaining stopped at the stopping location.

Figure 5:
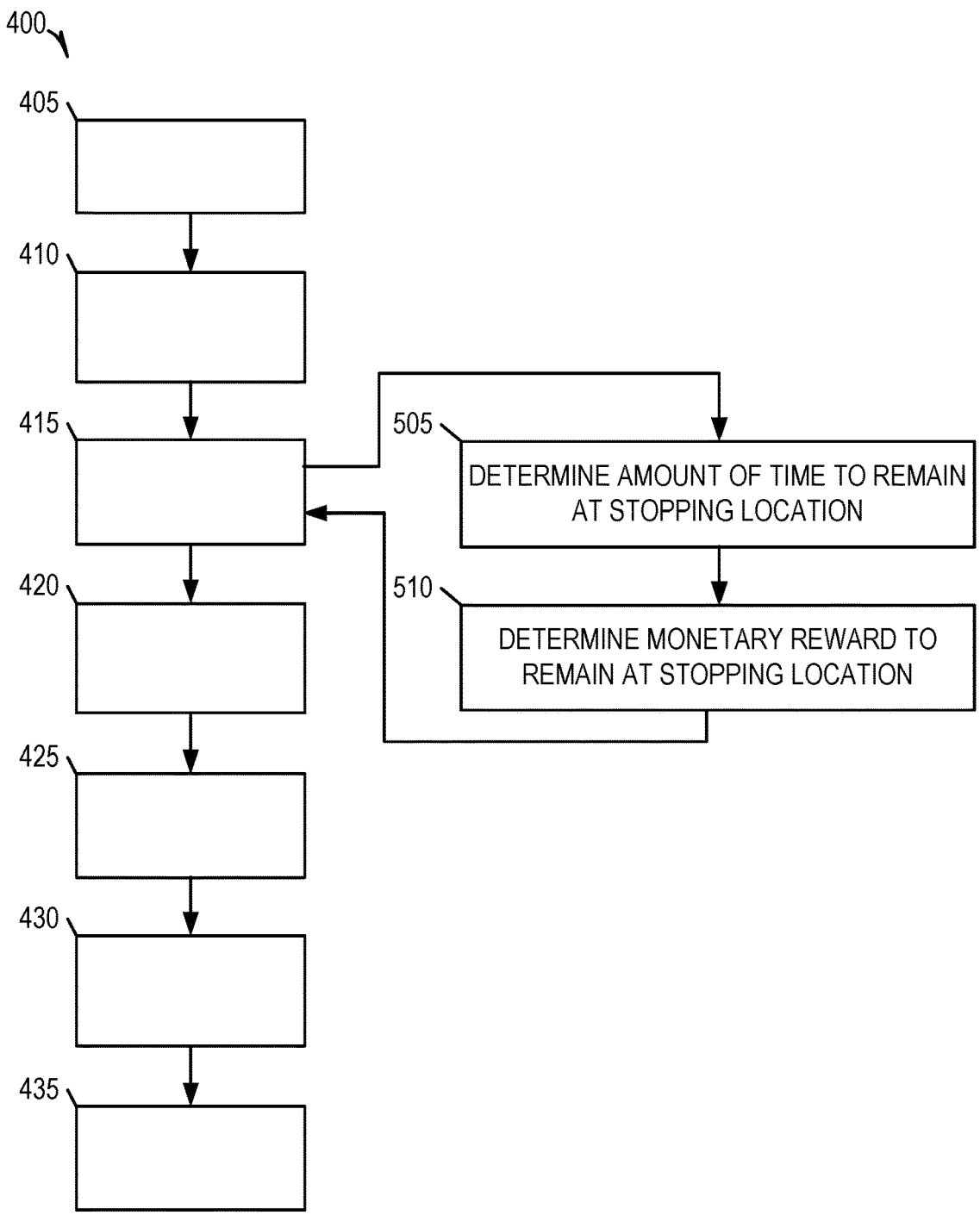

As shown in FIG. 5, the method 400 may, in some embodiments, include one or more of operations 505 and 510 Consistent with these embodiments, any one or more of the operations 505 and 510 may be performed as part of operation 410 (e.g., as a sub-routine or sub-operations) where the dispatch system 106 generates the request for the first vehicle to remain stopped at the stopping location.

At operation 505, the dispatch system 106 determines an amount of time for the first vehicle to remain at the stopping location based on the one or more criteria. Accordingly, the determining of the amount of time may be based on any one or more of: an estimated arrival time of a second vehicle at a target location associated with the PDZ; an estimated arrival time of a second vehicle to the PDZ; historical availability of PDZs associated with a target location of a second vehicle; historical demand for ride or delivery services in the area around the stopping location; costs associated with remaining at the stopping location; a probabilistic model that estimates availability of PDZs in the area; traffic information; and legal restrictions such as time limits or other restrictions imposed on remaining at the stopping location. As an example, the dispatch system 106 may determine the first vehicle should remain stopped at the stopping location until the estimated time of arrival. As another example, the dispatch system 106 may determine the first vehicle should remain stopped at the stopping location for the full duration permitted by legal restrictions concerning the stopping location.

At operation 510, the dispatch system 106 determines a monetary reward for the first vehicle to remain at the stopping location. In embodiments in which the request includes the option to accept or deny, the monetary reward may serve as an incentive to accept the request. In some embodiments, the monetary reward may be a fixed dollar amount applied to every request. In some embodiments, the monetary reward is based on the amount of time the first vehicle is to remain at the stopping location. For example, the monetary reward may be based on a fixed rate (e.g., $1/min) and may increase as the amount of time increases.

In some embodiments, the monetary reward may be based on costs associated with the first vehicle remaining at the stopping location. These costs may be based on ride or delivery service opportunities that the first vehicle must forego to remain stopped at the stopping location. As an example, the monetary reward may cover or exceed the costs associated with the first vehicle forgoing ride or delivery service opportunities so as to incentivize the first vehicle to remain stopped at the stopping location. Accordingly, in some embodiments, the determining of the monetary reward may include determining costs associated with the first vehicle remaining stopped at the stopping location. The dispatch system 106 may determine costs based on historical and/or real-time demand for ride or delivery services in an area serviced by the first vehicle.

Figure 6:
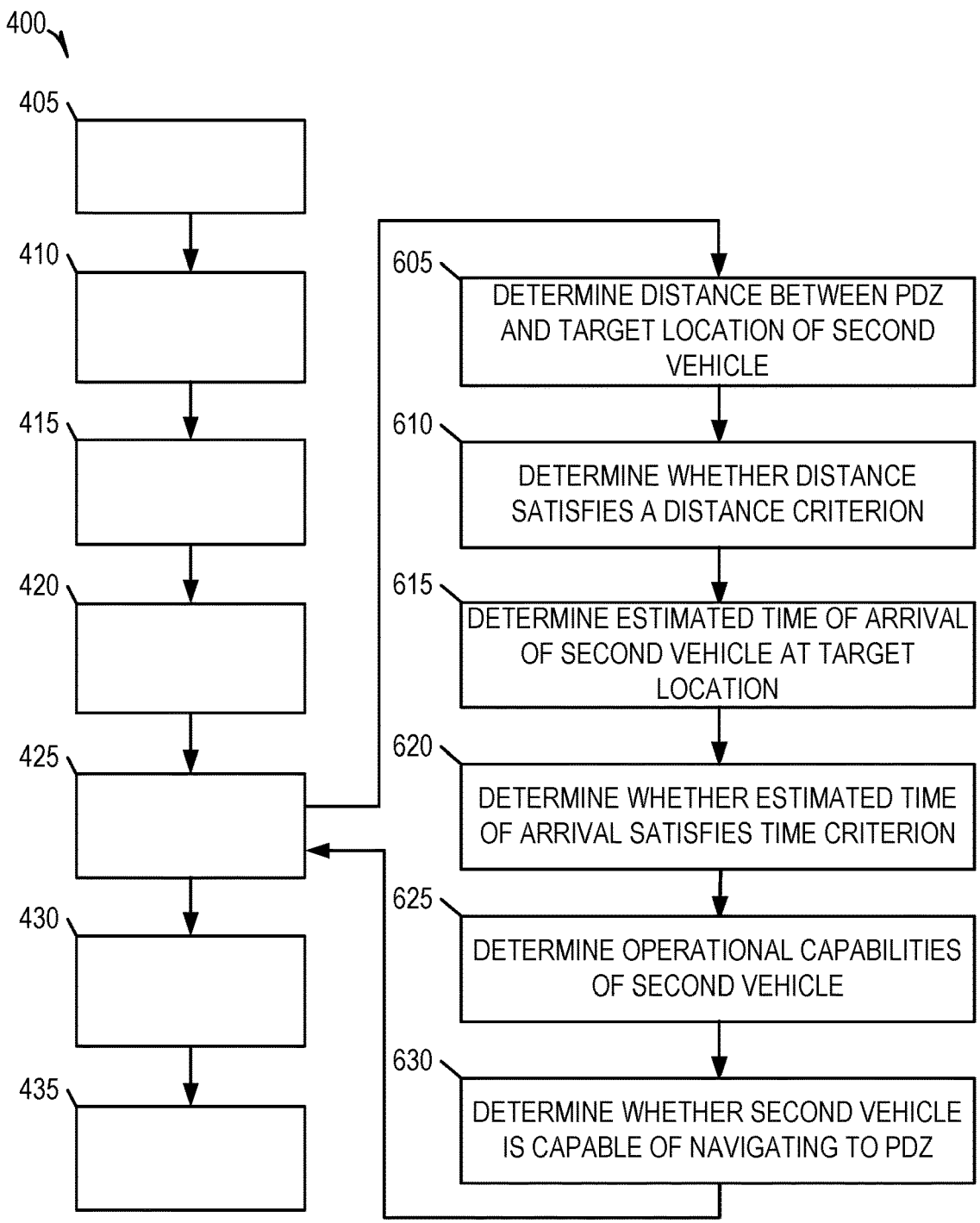

As shown in FIG. 6, the method 400 may, in some embodiments, include any one or more of operations 605, 610, 615, 620, 625, and 630. Consistent with these embodiments, any one or more of the operations 605, 610, 615, 620, 625, and 630 may be performed as part of (e.g., as a sub-routine or sub-operations) the operation 425 where the dispatch system 106 identifies the second vehicle to claim the PDZ.

At operation 605, the dispatch system 106 determines a distance between the PDZ and a target location of a second vehicle. The dispatch system 106 may determine the distance based on map data 226.

At operation 610, the dispatch system 106 determines whether the distances between the PDZ and the target location of the second vehicle satisfy a distance criterion. For example, the dispatch system 106 may compare the distance to a threshold distance and determine whether the distance is within the threshold distance. It shall be noted that, in some embodiments, rather than determining whether the distance between the PDZ and the target location of the second vehicle satisfies the distance criterion, the dispatch system 106 may instead maintain a predetermined look-up table that specifies associations between PDZ and locations, and the dispatch system 106 may utilize the table to identify a second vehicle having a target location associated with the PDZ.

At operation 615, the dispatch system 106 determines an estimated time of arrival of the second vehicle to the PDZ or the target location. The dispatch system 106 may determine the estimated time of arrival based on a current location of the second vehicle, the target location of the second vehicle or the PDZ, a distance between the current location of the second vehicle and the target location or the PDZ, traffic information, legal restrictions such as speed limits, operational capabilities of the second vehicle, and any obstacles in a route from the current location of the vehicle and the target location.

In some embodiments, the dispatch system 106 determines the estimated time of arrival based on a route of the second vehicle. The route may be determined by the dispatch system 106 or may be determined by a vehicle autonomy system of the second vehicle. As an example, the dispatch system 106 can estimate the projected speed of the second vehicle over the remainder of its route. The projected speed of the second vehicle can be based on the speed limit of the roadways to be traversed to reach the target location, traffic conditions on the roadways to be traversed to reach the target location, and/or other suitable factors.

At operation 620, the dispatch system 106 determines whether the estimated time of arrival satisfies a time criterion. For example, the dispatch system 106 may compare the estimated time of arrival with a time threshold, and determine whether the time of arrival exceeds the time threshold. In some embodiments, the time threshold is a predetermined value. In some embodiments, the time threshold is based on the amount of time the first vehicle is to remain stopped at the stopping location. In some embodiments, both the time threshold and the amount of time the first vehicle is to remain stopped at the stopping location both correspond to a predetermined value.

At operation 625, the dispatch system 106 determines operational capabilities of the second vehicle. In some embodiments, the dispatch system 106 may maintain operational capability data for vehicles it communicates with, where the operational capability data specifies operational capabilities for each vehicle. In some embodiments, the dispatch system 106 may request operational capability data from a vehicle autonomy system of the second vehicle.

At operation 630, the dispatch system 106 determines whether the second vehicle is capable of navigating to the PDZ based on the operational capabilities of the second vehicle. As an example, the second vehicle may be incapable of moving in reverse, and if navigating to the PDZ would require the second vehicle to move in reverse, the second vehicle would be incapable of navigating to the PDZ. Other limitations imposed by operational capabilities may relate to a vehicle's ability to make right or left turns, traverse inclines or declines of certain grades, travel certain distances, or travel above or below certain speeds.

Figure 7:
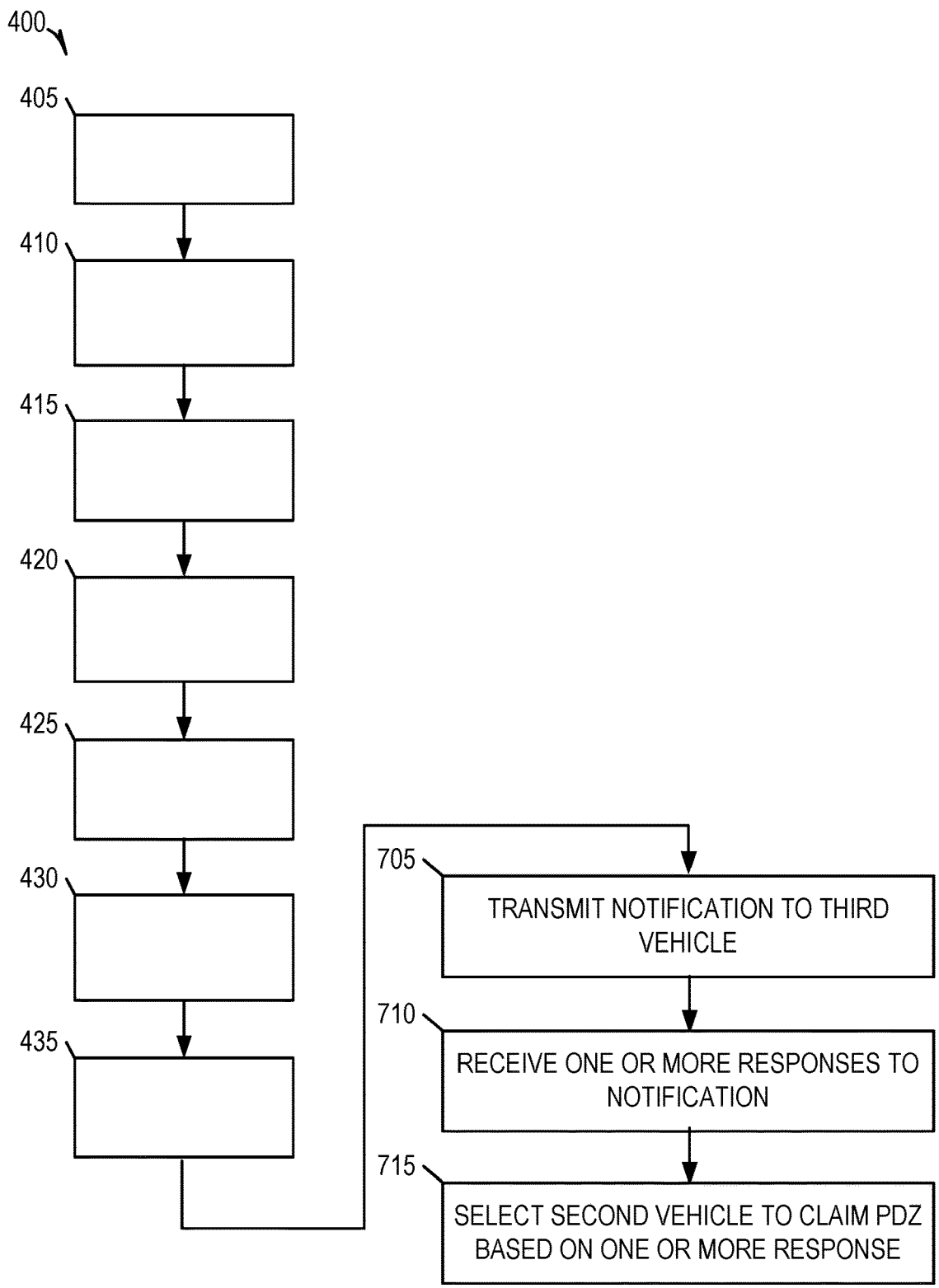

As shown in FIG. 7, the method 400 may, in some embodiments, include any one or more of operations 705, 710, and 715. Consistent with these embodiments, any one or more of the operations 705, 710, and 715 may be performed subsequent to the operation 435 where the dispatch system 106 transmits the notification to the second vehicle.

At operation 705, the dispatch system 106 transmits the notification to a third vehicle, specifically to a vehicle autonomy system of the third vehicle. Consistent with these embodiments, the notification provides the second and third vehicle an option to claim the PDZ. Consistent with at least some of these embodiments, the notification provides the second and third vehicles the ability to submit a bid amount to claim the PDZ.

At operation 710, the dispatch system 106 receives one or more responses to the notification. The one or more responses include at least a response from the second vehicle. Each response may include an indication of whether the corresponding vehicle is to claim the PDZ. In embodiments in which the notification allows submission of a bid amount, each response may include a bid amount.

At operation 715, the dispatch system 106 selects the second vehicle to claim the PDZ based on the one or more responses. For example, the dispatch system 106 may select the second vehicle based on the second vehicle being the only vehicle to respond or the only vehicle to provide confirmation of the claim to the PDZ. As another example, the dispatch system 106 may select the second vehicle based on the bid amount provided by the second vehicle being higher than the bid amount provided by the third vehicle.

Figure 8:
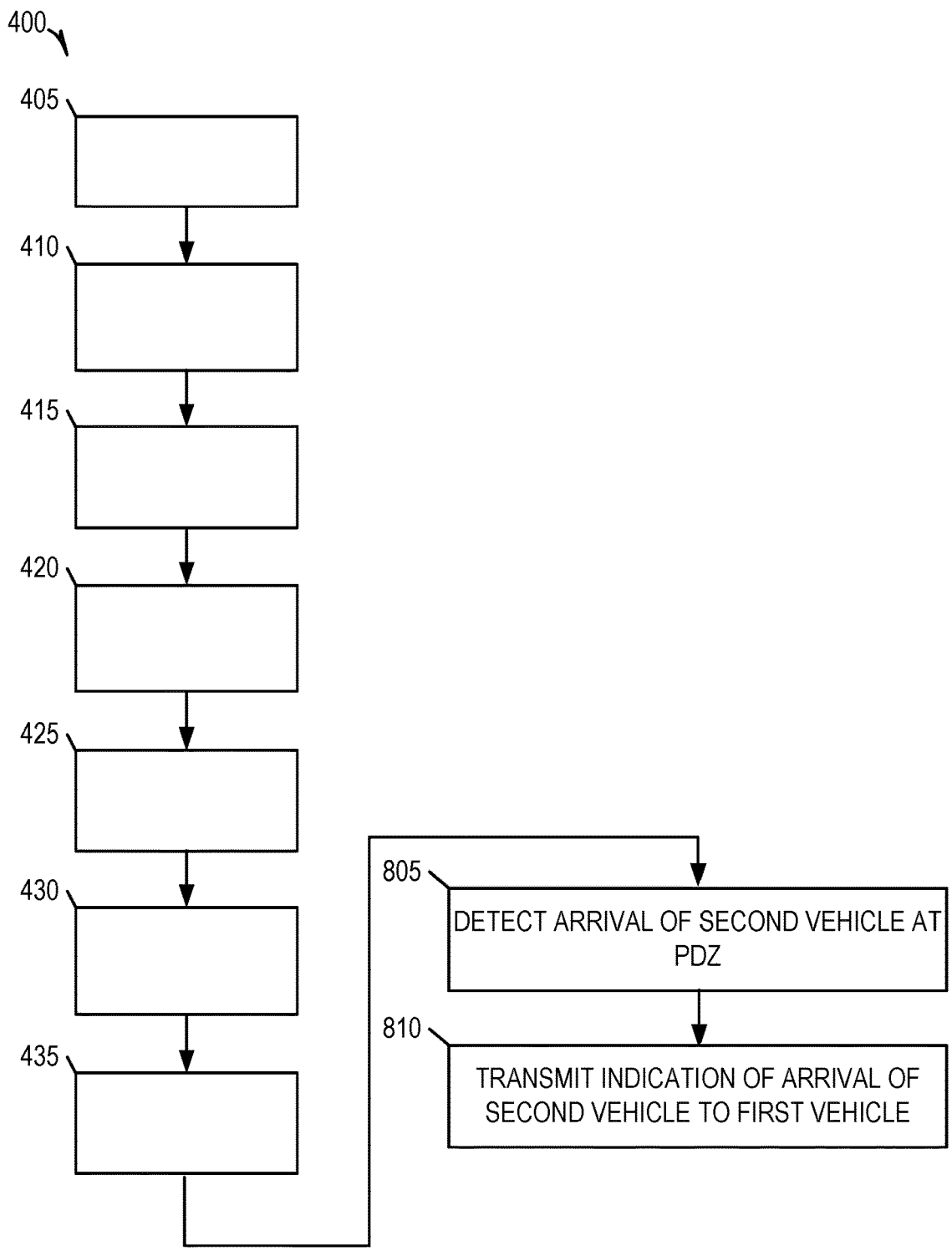

As shown in FIG. 8, the method 400 may, in some embodiments, include any one or more of operations 805 and 810. Consistent with these embodiments, any one or more of the operations 805 and 810 may be performed subsequent to the operation 435 where the dispatch system 106 transmits the notification to the second vehicle.

At operation 805, the dispatch system 106 detects arrival of the second vehicle at the PDZ. In some embodiments, the dispatch system 106 may detect the arrival of the second vehicle based on an indication provided by the second vehicle. The indication may be or include an electronic message or data packet transmitted by the vehicle autonomy system. In some embodiments, the dispatch system 106 may detect arrival of the second vehicle at the PDZ based on detecting a current location of the second vehicle being at or within a certain distance of the PDZ.

At operation 810, the dispatch system 106 transmits an indication of arrival of the second vehicle to a vehicle autonomy system of the first vehicle. In turn, the first vehicle vacates the PDZ to allow the second vehicle to claim the PDZ. The indication may be or include an electronic message or data packet transmitted by the dispatch system 106. In some embodiments, the indication may include a command that causes the vehicle autonomy system of the first vehicle to control operation of the first vehicle such that the first vehicle vacates the PDZ.

As noted above, in some embodiments, the second vehicle may be capable of communication directly with the first vehicle, and may provide an indication of arrival at the PDZ directly to the first vehicle rather than relying upon the vehicle dispatch system 106 to detect arrival of the second vehicle at the PDZ and transmit the indication to the first vehicle. Further, in some embodiments, the second vehicle may simply vacate the PDZ after an expiration of an amount of time specified in the request and thus, in theses embodiments, it may be unnecessary to transmit the indication of the arrival of the second vehicle to the first vehicle to prompt the first vehicle to vacate the PDZ.

Figure 9:
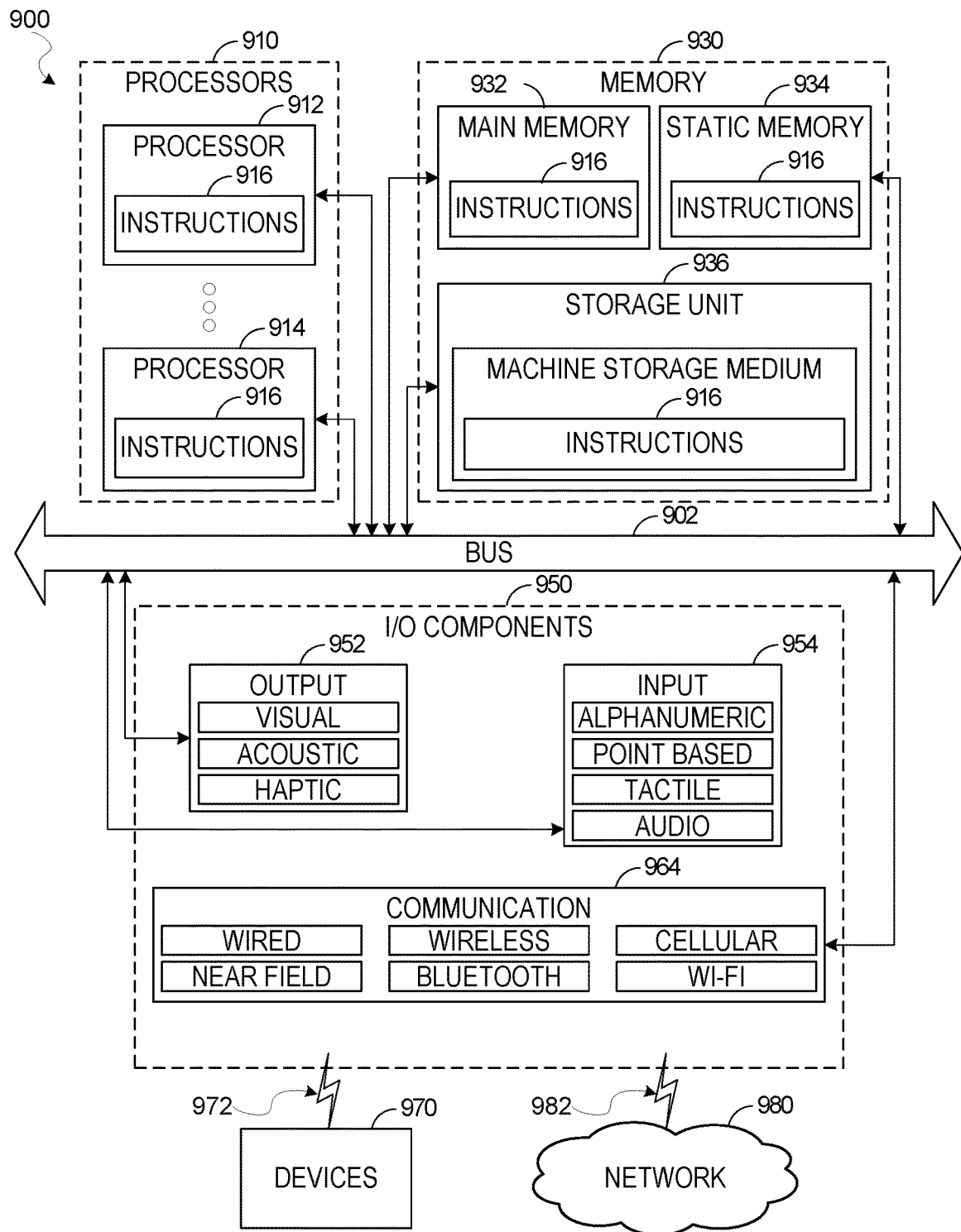
FIG. 9 is a diagrammatic representation of a machine in the example form of a computer system within which a set of instructions for causing the machine to perform any one or more of the methodologies discussed herein may be executed.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 400. In this way, the instructions 916 transform a general, non-programmed machine into a particular machine 900, such as the vehicle autonomy system 104, that is specially configured to carry out the described and illustrated functions in the manner described here. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and input/output (I/O) components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, both accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)).

Executable Instructions and Machine Storage Medium

The various memories (e.g., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   locating, by one or more hardware processors of a machine, a pick-up/drop-off zone (PDZ) based on a stopping location of a first autonomous vehicle;
   generating, by the one or more hardware processors of the machine, a set of instructions for the first autonomous vehicle to remain stopped at the stopping location, the generating of the set of instructions including determining an amount of time for the first autonomous vehicle to remain stopped at the stopping location;
   transmitting, to a vehicle autonomy system of the first autonomous vehicle, the set of instructions that causes the vehicle autonomy system to control operation of the first autonomous vehicle such that the first autonomous vehicle remains stopped at the stopping location;
   identifying a second autonomous vehicle to claim the PDZ based on a target location of the second autonomous vehicle; and
   transmitting a notification to a vehicle autonomy system of the second autonomous vehicle that includes a command that causes the vehicle autonomy system of the second autonomous vehicle to control the second autonomous vehicle along a route to the PDZ.

2. The method of claim 1, wherein the request includes an option for the vehicle autonomy system of the first autonomous vehicle to accept or reject the request to remain stopped at the stopping location.

3. The method of claim 1, wherein generating the request further comprises:
   determining a monetary reward for the first autonomous vehicle to remain stopped at the stopping location; and
   wherein the request specifies the monetary reward.

4. The method of claim 1, wherein the identifying the second autonomous vehicle to claim the PDZ comprises:
   determining a distance between the PDZ and the target location of the second autonomous vehicle; and
   determining that the distance satisfies a distance criterion.

5. The method of claim 1, wherein the identifying the second autonomous vehicle to claim the PDZ comprises:
   determining an estimated time of arrival of the second autonomous vehicle to the target location or to the PDZ; and
   determining that the estimated time of arrival satisfies a time criterion.

6. The method of claim 1, wherein the identifying the second autonomous vehicle to claim the PDZ comprises:
   determining operational capabilities of the second autonomous vehicle; and
   determining that the second autonomous vehicle is capable of navigating to the PDZ based on the operational capabilities of the second autonomous vehicle.

7. The method of claim 1, wherein before transmitting the notification to the vehicle autonomy system of the second autonomous vehicle, the method further comprises
   generating the notification that includes the command that causes the vehicle autonomy system of the second autonomous vehicle to control the second autonomous vehicle along a route to the PDZ and includes a location of the PDZ and identifies the PDZ as being available; and
   transmitting the notification to the vehicle autonomy system of the second autonomous vehicle.

8. The method of claim 7, wherein the generating of the notification includes generating the route to the PDZ based at least on a current location of the second autonomous vehicle.

9. The method of claim 8, wherein the notification includes an option for the vehicle autonomy system of the second autonomous vehicle to accept or reject the route to the PDZ.

10. The method of claim 1, further comprising:
    receiving, from the vehicle autonomy system of the second autonomous vehicle, an indication of arrival of the second autonomous vehicle at the PDZ; and
    in response to receiving the indication, transmitting, to the vehicle autonomy system of the first autonomous vehicle, the indication of arrival of the second autonomous vehicle at the PDZ, the vehicle autonomy system to cause the first autonomous vehicle to vacate the stopping location in response to receiving the indication.

11. The method of claim 1, the one or more criteria comprising one or more of: a target location of a second autonomous vehicle; an estimated arrival time of the second autonomous vehicle at the stopping location; historical availability of PDZs associated with the stopping location; historical demand for ride or delivery services in an area around the stopping location; costs associated with remaining at the stopping location; a probabilistic model that estimates availability of PDZs associated with the target location of the second autonomous vehicle; traffic information; or legal restrictions imposed on remaining stopped at the stopping location.

12. A system comprising:
at least one processor of a machine; and
a memory storing instructions that cause the at least one processor to perform operations comprising:
   locating a pick-up/drop-off zone (PDZ) based on a stopping location of a first autonomous vehicle;
   generating a set of instructions for the first autonomous vehicle to remain stopped at the stopping location, the generating of the set of instructions including determining an amount of time for the first autonomous vehicle to remain stopped at the stopping location;
   transmitting, to a vehicle autonomy system of the first autonomous vehicle, the set of instructions that causes the vehicle autonomy system to control operation of the first autonomous vehicle such that the first autonomous vehicle remains stopped at the stopping location;
   identifying a second autonomous vehicle to claim the PDZ based on a target location of the second autonomous vehicle; and
   transmitting a notification to a vehicle autonomy system of the second autonomous vehicle that includes a command that causes the vehicle autonomy system of the second autonomous vehicle to control the second autonomous vehicle along a route to the PDZ.

13. The system of claim 12, wherein the operations further comprise:
   based on identifying the second autonomous vehicle, generating the notification that includes the command that causes the vehicle autonomy system of the second autonomous vehicle to control the second autonomous vehicle along a route to the PDZ and includes a location of the PDZ and identifies the PDZ as being available; and
   transmitting the notification to the vehicle autonomy system of the second autonomous vehicle.

14. The system of claim 13 wherein the identifying the second autonomous vehicle to claim the PDZ comprises at least one of: determining a distance between the stopping location of the first autonomous vehicle and the target location of the second autonomous vehicle satisfies a distance criterion; determining an estimated time of arrival of the second autonomous vehicle to the PDZ satisfies a time criterion; or determining the second autonomous vehicle is capable of navigating to the PDZ based on operational capabilities of the second autonomous vehicle.

15. The system of claim 13, wherein the generating of the notification includes generating a route to the PDZ based at least on a current location of the second autonomous vehicle.

16. The system of claim 12, wherein the operations further comprise:
   receiving, from the vehicle autonomy system of the second autonomous vehicle, an indication of arrival of the second autonomous vehicle at the PDZ; and
   in response to receiving the indication, transmitting, to the vehicle autonomy system of the first autonomous vehicle, the indication of arrival of the second autonomous vehicle at the PDZ, the vehicle autonomy system of the first autonomous vehicle to cause the first autonomous vehicle to vacate the stopping location in response to receiving the indication.

17. A tangible computer-readable medium storing instructions that, when executed by one or more processors of a machine, cause the one or more processors of the machine to perform operations comprising:
   locating a pick-up/drop-off zone (PDZ) based on a stopping location of a first autonomous vehicle;
   generating a set of instructions for the first autonomous vehicle to remain stopped at the stopping location, the generating of the set of instructions including determining an amount of time for the first autonomous vehicle to remain stopped at the stopping location;
   transmitting, to a vehicle autonomy system of the first autonomous vehicle, the set of instructions that causes the vehicle autonomy system to control operation of the first autonomous vehicle such that the first autonomous vehicle remains stopped at the stopping location;
   identifying a second autonomous vehicle to claim the PDZ based on a target location of the second autonomous vehicle; and
   transmitting a notification to a vehicle autonomy system of the second autonomous vehicle that includes a command that causes the vehicle autonomy system of the second autonomous vehicle to control the second autonomous vehicle along a route to the PDZ.

18. The computer-readable medium of claim 17, wherein the operations further comprise:
   receiving, from the vehicle autonomy system of the second autonomous vehicle, an indication of arrival of the second autonomous vehicle at the PDZ; and
   in response to receiving the indication, transmitting, to the vehicle autonomy system of the first autonomous vehicle, the indication of arrival of the second autonomous vehicle at the PDZ, the vehicle autonomy system of the first autonomous vehicle to cause the first autonomous vehicle to vacate the stopping location in response to receiving the indication.

19. The computer-readable medium of claim 17, wherein the identifying the second autonomous vehicle to claim the PDZ comprises at least one of:
   determining a distance between the stopping location of the first autonomous vehicle and the target location of the second autonomous vehicle satisfies a distance criterion;
   determining an estimated time of arrival of the second autonomous vehicle to the PDZ satisfies a time criterion; or
   determining the second autonomous vehicle is capable of navigating to the PDZ based on operational capabilities of the second autonomous vehicle.

20. The computer-readable medium of claim 17, wherein the notification further includes a route to the PDZ based at least on a current location of the second autonomous vehicle.

* * * * *